Feb. 26, 1952   B. B. HUIZINGA   2,587,323
RAKING AND BUNDLING MACHINE
Filed June 5, 1946   2 SHEETS—SHEET 1
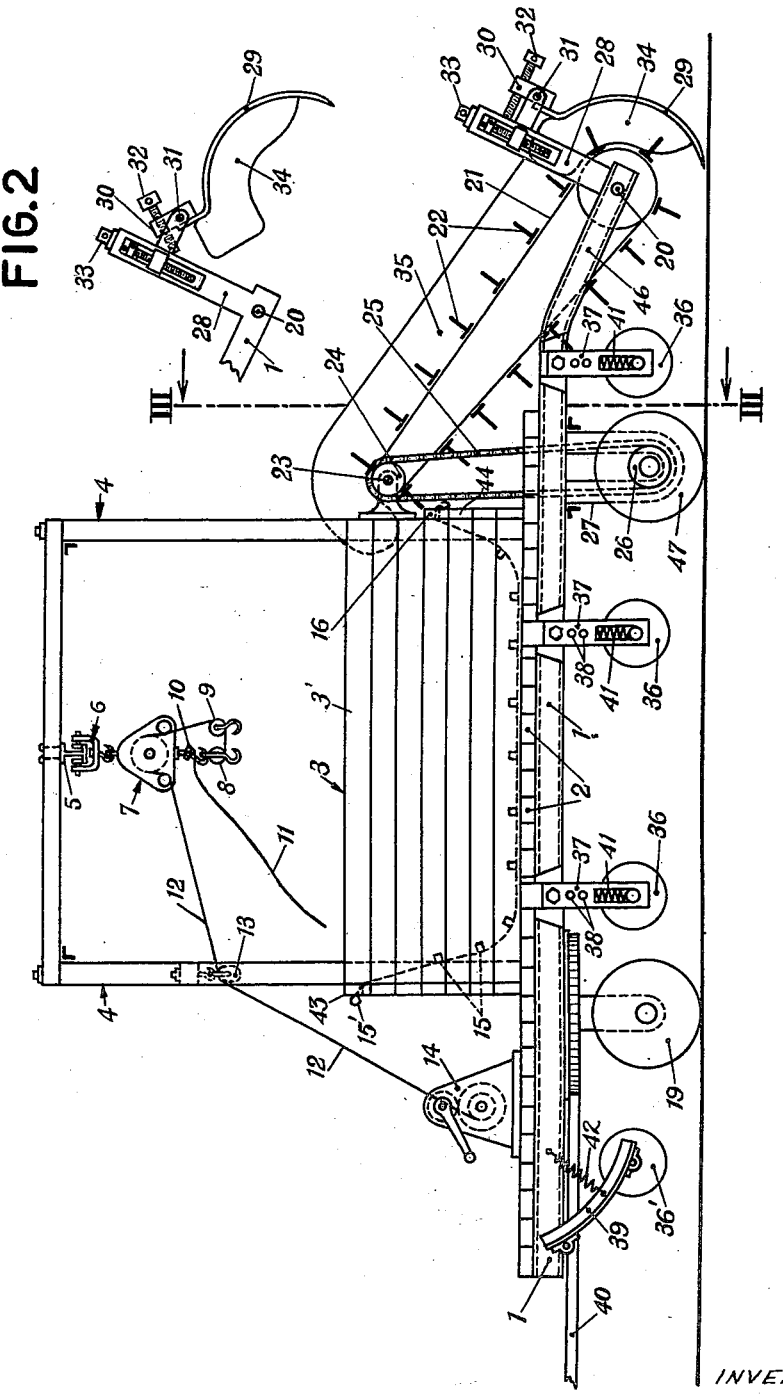
INVENTOR
BOUKE BONTJE HUIZINGA
By John P. Wixonor
ATTORNEY

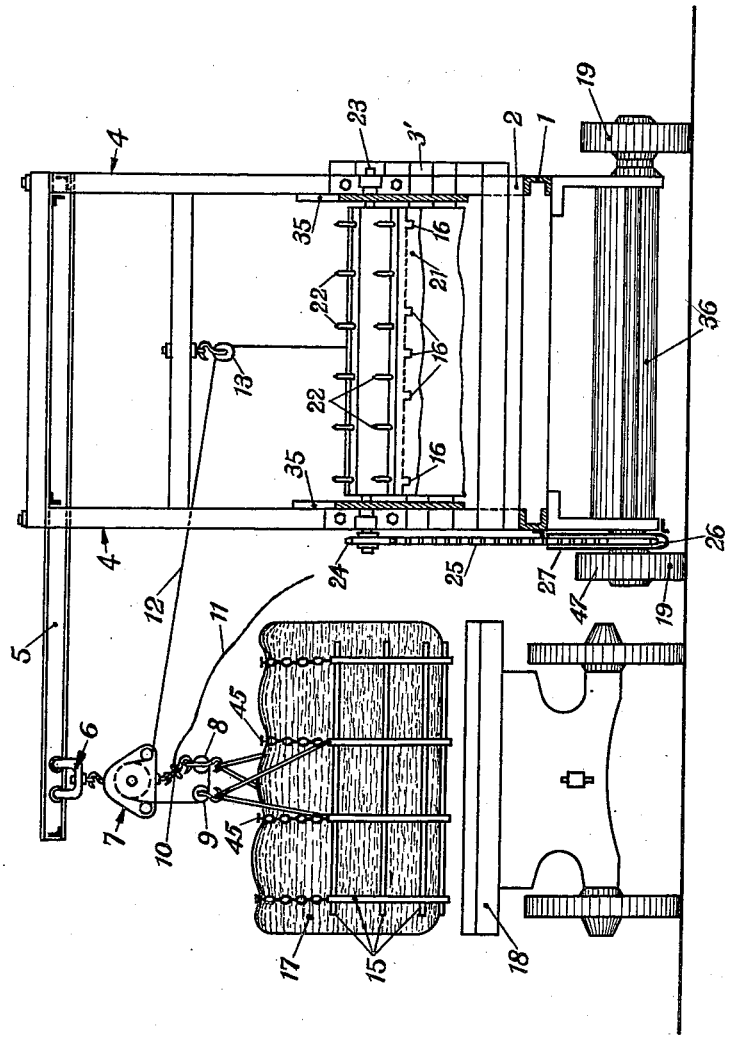

Patented Feb. 26, 1952

2,587,323

UNITED STATES PATENT OFFICE 2,587,323

RAKING AND BUNDLING MACHINE

Bouke Bontje Huizinga, Leeuwarden, Netherlands

Application June 5, 1946, Serial No. 674,533
In Great Britain March 23, 1946

6 Claims. (Cl. 56—341)

The invention comprises an agricultural machine for picking up, conveying, packing and unloading hay or other agricultural produce and aims at accelerating and facilitating such operations on the field.

The machine according to the invention consists of a tray mounted on a car or wagon frame and having one or more of the side walls of the tray easily removable or pivotal outwardly. A gantry or scaffold is mounted on the frame and a lifting tackle or hoisting arrangement is suspended therefrom and thus the tackle is located above the tray, which tackle also may be moved in a transverse direction beyond the side of the machine. The frame has an extension at the rear end and a rake conveyor driven by the travelling machine is carried thereby, such rake conveyor gathering, carrying up and delivering into the tray the hay from the field. In order to reduce the thickness of the irregular hay layer on the field to a smaller dimension and to make this uniform, rollers as broad as the car frame of the machine are arranged one behind the other under the car frame. These rollers press the hay on the field down before it is taken up by the rake conveyor, but they themselves are capable of vertical displacement if necessary. Within the tray a net is disposed, upon which the hay is delivered by the conveyor and beaten down by a man. The two ends of the net, provided with hooks and eyes or chains, are secured against the front and the rear wall of the tray. When the net is full, these ends are hooked on the pulley block arrangement and the net is then pulled tightly around the hay, after which the cylindrical hay pack thus formed is finally bound by means of the hooks and eyes or chains and unloaded on a transport car beside the machine or left temporarily on the field. This car, when it is fully loaded with packs, is transported to the barn or a hay rick. There the nets are removed from the packs.

A method of carrying out the invention is illustrated by way of example and diagrammatically by the accompanying drawings, on which:

Fig. 1 is a side view of the machine,

Fig. 2 illustrates a detail hereinafter referred to, and

Fig. 3 is a cross section taken on the line III—III of Fig. 1.

On the wagon or car chassis frame 1, a floor 2 is arranged and a tray 3 and a gantry or scaffold 4 are supported thereon. At the upper part of this scaffold the I-beam 5, which extends transversely beyond the frame, is fixed and a crab 6 with pulley block arrangement 7 is provided with floating pulleys 8 and 9, stone tong 10 and pull line 11 being suspended from the pulley block. The pulley rope 12 of the pulley block arrangement is guided over a freely hung guide pulley 13 to a winch 14. One or more of the side walls 3' of the tray or body 3 can be removably disposed thereon in any suitable manner or pivoted outwardly by turning it around a hinge (not shown) at the lower end thereof, which is necessary for facilitating unloading the contents of the tray. Fully over the bottom of the tray there is spread out a net 15, conveniently a lattice net. Two ends of the net are carried up to lie adjacent the front and the rear walls 43 and 44, respectively, of the tray, the fastening ends of the traces or straps 15 of the net being engaged in slots 16 in the upper edges of these walls, so as to keep the net stretched for receiving the hay or the like. After the tray has been filled with hay and the latter firmly pressed down, the hooks on the floating pulleys 8 and 9 are fastened to the middle traces 45 of the net and the hauling rope 12 is wound on the winch. The hay in the tray is now formed into a cylindrical pack 17 and the ends of all traces or straps 15' of the net can conveniently be hooked together and the pack bound. It now may be unloaded on to a transport car 18 placed at the side of the machine. Should the bottom of the car 18 be higher than the floor 2 of the machine, the pulley block arrangement 7 with crab 6 is used for transferring the pack. Should, however, the floor of the car 18 be level or lower than the floor 2 of the machine, then the hay pack can be pushed from one floor to the other. The car or wagon 18 can be loaded with several packs and when it is fully loaded, it is driven away and unloaded in a barn or on a hayrick, the machine remaining in the field, so that in the meantime it can load other transport cars 18 or temporarily deposit packs on the field. The harvesting in this manner takes only a short time, which is a great advantage in all respects.

The car or wagon frame 1 of the machine runs on the wheels 19 and drive wheel 47 and at the rear end it has an extension 46 which inclines downwardly and rearwardly. The lower shaft 20 of the conveyor 21, which is shown provided with upstanding pins 22, is mounted on this extension. The upper shaft 23 of this conveyor is supported by bearings fastened to the car tray 3. For the purpose of loading the tray with the hay carried up by the conveyor 21, the rear wall of the car tray 3 is of lower height than the front wall. A sprocket 24 is mounted on the upper shaft 23 and a chain 25, running over it, is engaged on a sprocket 26 which is driven by the left rear car wheel 47 or by the rotating wheel axle. The lower part of the chain 25 runs in a chain guard casing 27. An intermediate frame 28 is mounted approximately at right angles on the rear end of the car frame 1 or forms one piece with it. This intermediate frame carries the tow rake 29, the teeth or prongs of which are fastened to a beam 30 hinging on trunnions 31. The inclination and the height of the teeth from the ground can be regulated by means of screw bolts 32 and 33 and, by adjusting them, it is also possible to put the teeth out of service such as in the position shown in Figure 2. The tow rake 29, as well as the conveyor 21, are almost as broad as the car tray and have wind shields 34 and 35 at the sides for preventing the hay from blowing away. In order to supply a regular and not too thick a layer of hay to the tow rake, a number of rollers 36, extending almost the breadth of the car frame, are arranged under this car frame. These rollers compress the hay by their weight and/or spring pressure, as by springs 41, but they have a clearance movement in vertical direction in guides 37 for the purpose of preventing the choking of the feed. The guides 37 have holes 38 for adjustably fastening them higher or lower on the car frame 1. The front roller 36' has to do most of the heavy work and must be capable of making a greater deflection. For this purpose this roller is arranged at the lower end of spring balanced arms 39 suspended in an inclined direction, as by a spring 42 interposed between frame 1 and an intermediate portion of each arm 39. The machine can be towed by a beam 40.

What is claimed is:

1. An agricultural machine for collecting, packing, and unloading hay in a field comprising, in combination, a frame having a floor on which the hay is collected and packed, a plurality of ground bearing wheels mounted on said frame for movably supporting said machine, and means including at least a pair of spaced rollers depending downwardly from said frame for compressing the hay in a compact layer while on the ground, said rollers being spaced above the lower surface level of said ground bearing wheels and extending substantially the width of said frame.

2. An agricultural machine in accordance with claim 1, and means depending from said frame ahead of said wheels for pivotally carrying one of said rollers.

3. An agricultural machine in accordance with claim 1, an inclined arm pivotally suspended from said frame for carrying one of said rollers, and a resilient element interposed between said arm and said frame for supporting said arm at an acute angle with respect to the frame.

4. An agricultural machine in accordance with claim 3, and adjustable means suspended from said frame for freely carrying the other roller of said pair of rollers.

5. An agricultural machine in accordance with claim 1, a rake connected to the rear of said frame for picking up said compacted hay layer from the ground, an inclined, continuous conveyor connected to the frame for carrying the raked hay to the floor of the frame, and means coupled to one of said ground bearing wheels for operating said continuous conveyor.

6. An agricultural machine in accordance with claim 5, in which said rake is adjustable with respect to the conveyor in accordance with the desired thickness of the compacted layer of hay and in which means are provided on the frame adjacent the floor for fastening the collected hay in a compact bundle.

BOUKE BONTJE HUIZINGA.

REFERENCES CITED

The following references are of record in the file of this patent:

UNITED STATES PATENTS

| Number | Name | Date |
|---|---|---|
| 273,462 | Capen | Mar. 6, 1883 |
| 488,732 | Ferguson | Dec. 27, 1892 |
| 676,320 | Johnson | June 11, 1901 |
| 1,025,287 | Mattson | May 7, 1912 |
| 1,237,543 | Morrison | Aug. 21, 1917 |
| 1,345,634 | Raymond | July 6, 1920 |
| 1,537,618 | Proper | May 12, 1925 |
| 2,035,705 | Kaser | Mar. 31, 1936 |